(12) United States Patent
Vanderhye

(10) Patent No.: US 7,869,083 B1
(45) Date of Patent: Jan. 11, 2011

(54) PRODUCING ARTWORK USING COLOR PRINTERS

(76) Inventor: Robert A. Vanderhye, 801 Ridge Dr., McLean, VA (US) 22101

( * ) Notice: Subject to any disclaimer, the term of this patent is extended or adjusted under 35 U.S.C. 154(b) by 2429 days.

(21) Appl. No.: 10/740,486

(22) Filed: Dec. 22, 2003

Related U.S. Application Data

(60) Provisional application No. 60/434,637, filed on Dec. 20, 2002.

(51) Int. Cl.
*G06F 15/00* (2006.01)
*G06K 1/00* (2006.01)
*H04N 1/04* (2006.01)
*G09F 5/02* (2006.01)
*G09G 5/00* (2006.01)

(52) U.S. Cl. ............. 358/1.4; 358/1.9; 358/1.15; 358/474; 345/592; 345/619

(58) Field of Classification Search .......... 358/474, 358/1.15, 1.9, 1.4; 345/619, 592; 382/276, 382/167; 347/23
See application file for complete search history.

(56) References Cited

U.S. PATENT DOCUMENTS

| | | | | |
|---|---|---|---|---|
| 5,136,401 | A * | 8/1992 | Yamamoto et al. | 358/474 |
| 6,176,521 | B1 * | 1/2001 | Mancuso | 283/91 |
| 6,522,418 | B2 * | 2/2003 | Yokomizo et al. | 358/1.15 |
| 6,749,282 | B2 * | 6/2004 | Kohno | 347/23 |
| 6,947,593 | B2 * | 9/2005 | Jia et al. | 382/167 |
| 7,103,230 | B1 * | 9/2006 | Jam et al. | 382/276 |
| 2002/0003631 | A1 * | 1/2002 | Abram et al. | 358/1.9 |
| 2003/0030650 | A1 * | 2/2003 | Ishizuka | 345/619 |
| 2004/0113919 | A1 * | 6/2004 | Hawksworth | 345/592 |

OTHER PUBLICATIONS

The Digital Printing Handbook, Daly, Amphoto Books, 2002, cover pages and text pages 138-139 (color copy of p. 139).
Adobe Photoshp 7.0 brief description, from www.adobe.com/photoshop; 2002.
Photo Editor+ description of CD Rom, 2002.

* cited by examiner

*Primary Examiner*—Thierry L Pham
*Assistant Examiner*—Satwant K Singh

(57) ABSTRACT

A method of producing a piece of artwork using a computer-controlled color printer (e.g. thermal in-jet printer) capable of printing at least three colors, is provided. The method includes: a) Inputting (e.g. from a digital camera, or the Internet) or selecting a multicolor image (e.g. a digital photograph) so that it is provided in the computer. b) Selectively disabling one or more of the colors, while not disabling all of the colors besides black, of the printer to insure little or none of the one or more disabled colors is printed by the printer; and c) with the printer, printing the non-disabled color or colors of the image onto a substrate (such as matte paper or canvas). In the method, a)-c) may be practiced to produce a final work of art, but preferably the method further includes d) further acting upon the substrate from c) to add artistic elements (e.g. adding acrylic paints, texture, color, foreign materials, and/or objects) to spaced portions of the substrate to produce a final artwork. Typically, b) is practiced to fully disable one or more colors (such as at least black and near black), but can be practiced to only partially disable one or more colors. For an ink-jet printer b) may be practiced by removing an active black ink cartridge. For any printer, b) may be practiced by using computer software. A printer to practice the method, and final artwork produced by the method, are also provided.

18 Claims, 15 Drawing Sheets
(3 of 15 Drawing Sheet(s) Filed in Color)

FIGURE 3
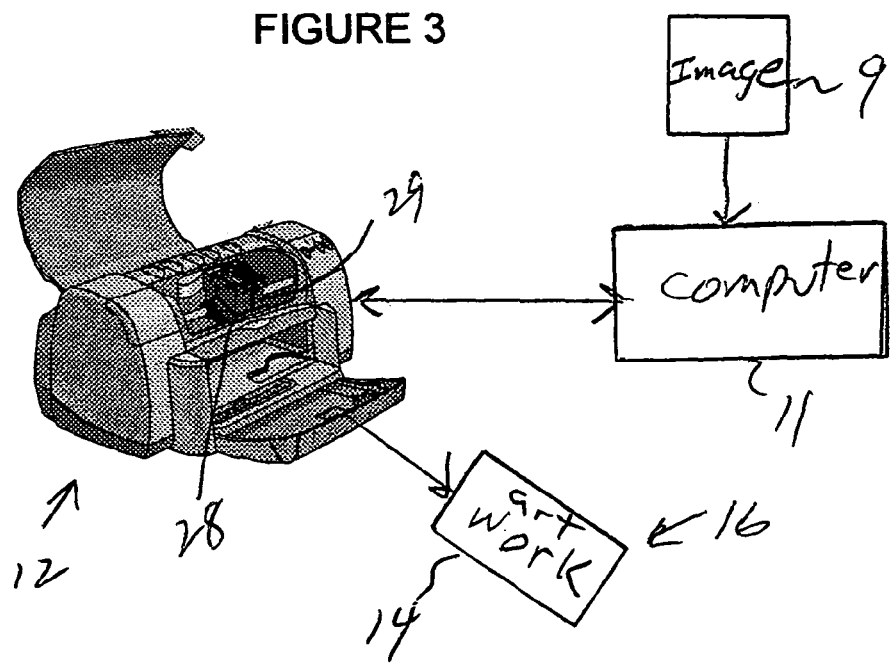
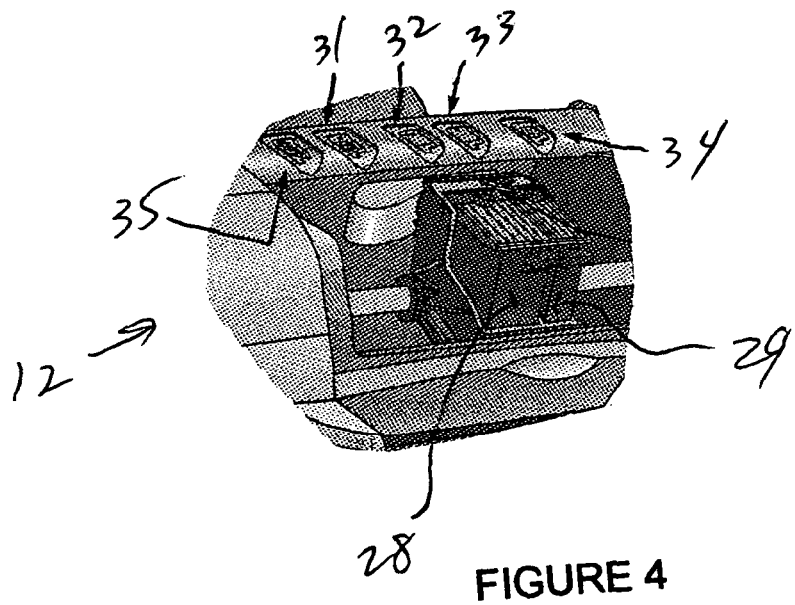
FIGURE 4

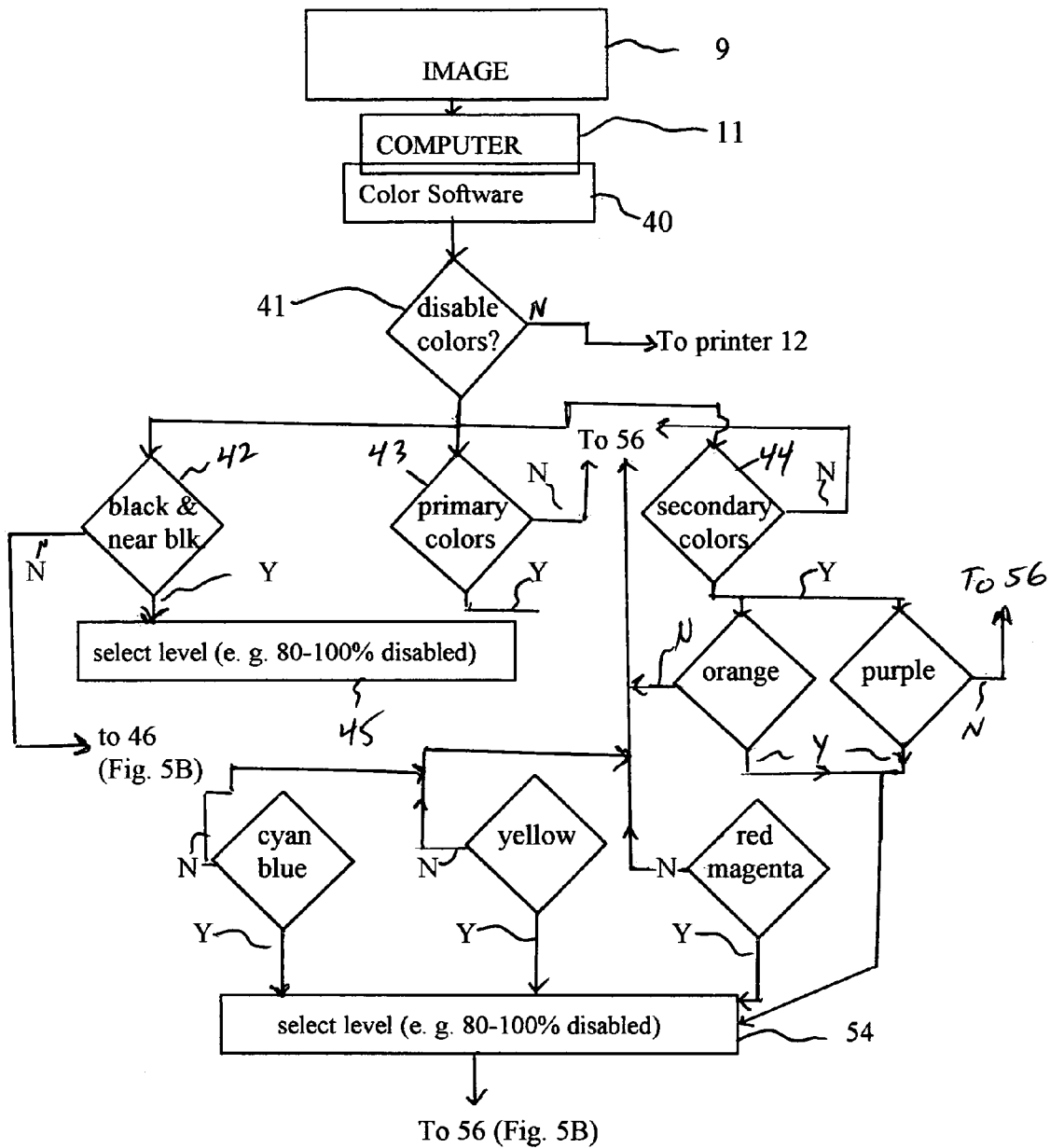

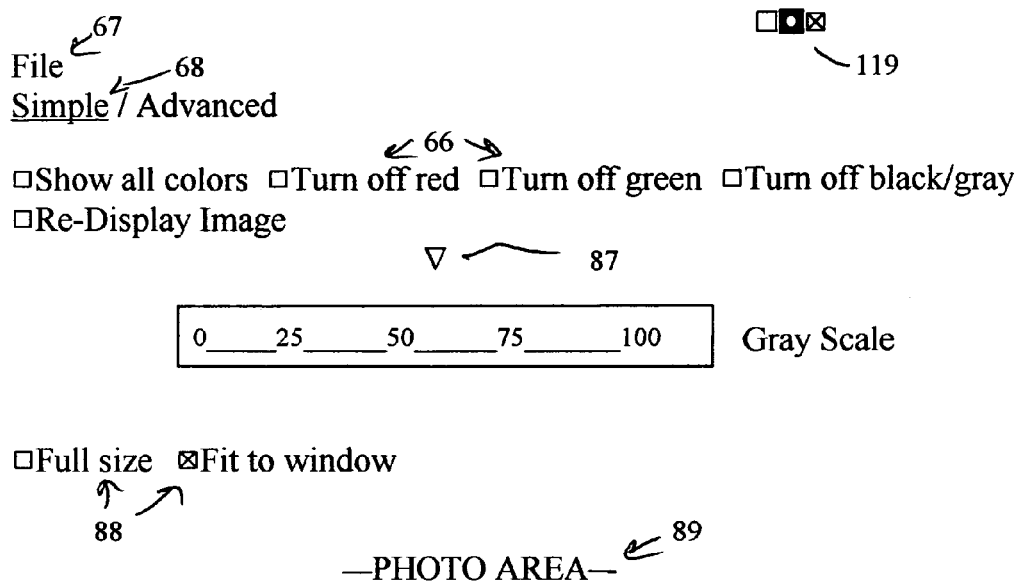
FIGURE 13
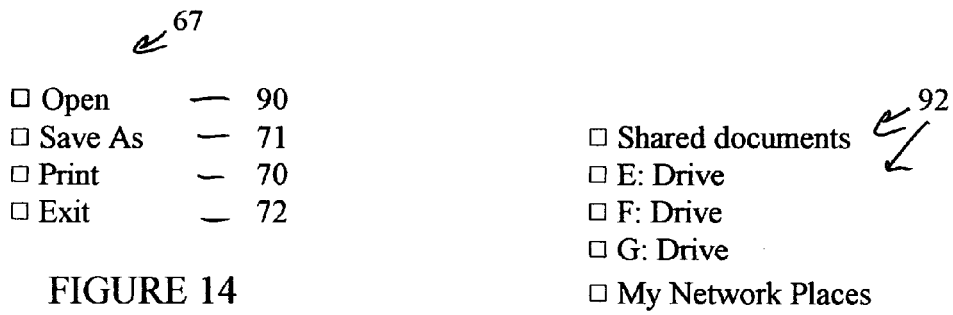
FIGURE 14
FIGURE 16

67 69 119

File

Simple / Advanced 98　　　　　　　　　　　　99
Rule　　　　　　　　　　　Description

Black to white　　　　　　　Change black & near black to white
Black to red　　　　　　　　Change blackish to reddish
Dull blue　　　　　　　　　Subtract 30 from blue value
Sharpen green　　　　　　　Add 25 to green value
Turn off red　　　　　　　　Turn off red
Modified green off　　　　　Turn off green if ≥ 100 but ≤ 200
White to yellow　　　　　　Change almost pure white to yellow

| ○ Add † | ○ Edit † | ○ Delete † | ○ Apply † | ○ Undo † | ○ Reset † | 14, 170, 28 |

100　　101　　102　　103　　104　　105　　106

—PHOTO AREA—
89

FIGURE 17

Create Rule 100

Name: _____ 108

Description: _____ 109

Conditions:　○ All　● Any　　　　○Add ○Edit ○Remove
　　　　　　　　　110　　　　　　　　　　　113

○ OK　○ Cancel
　111　　112

FIGURE 18

PRODUCING ARTWORK USING COLOR PRINTERS

CROSS REFERENCE TO RELATED APPLICATION

This application is based upon Provisional U.S. Application No. 60/434,637 filed Dec. 20, 2002, the disclosure of which is incorporated by reference herein.

BACKGROUND AND SUMMARY OF THE INVENTION

The invention relates to a method and apparatus for producing artwork, and the artwork so produced, using a color printer controlled by a computer. The invention can be practiced using almost any type of computer controlled color printer (that is a printer that prints in more than one color) including, but not limited to, inkjet and laser printers.

The invention is particularly useful for individuals who have an interest in creating their own works of art, but do not have the artistic or aesthetic ability to create art that they deem worthy of display. Typically such individuals become frustrated by their inability to draw even the most essential elements (such as human or animal figures, trees, furniture, or common other objects) which they consider a necessary precursor to making a finished product. According to the present invention, this drawback is overcome by providing the basic physical elements of composition in a piece of art work, allowing the aspiring artist to merely fill in elements of color, texture, and/or design that he or she considers desirable to make an acceptable to beautiful finished product.

The invention is particularly suited for teaching art to children, since there are many situations in which children want to have something they are proud of to show their friends or relatives when taking art. The invention allows almost any child to accomplish this, while he or she is simultaneously being taught many basic elements of art.

Alternatively and/or additionally, the invention provides a unique mixed media form of expression for even skilled artists. Artwork can be produced according to the invention that combines photography and painting or drawing to produce works of a type not heretofore known. Also, because a computer and printer are utilized in the practice of the invention, it is possible to easily make a large number of draft pieces of art work in a simple and quick manner. Only the most desirable drafts can be acted upon further, and/or selected.

According to one aspect of the present invention, there is provided a method of producing a work of art using a color printer which has the ability to print different colors on a substrate under computer control. The printer prints using ink (including what is commonly called toner or wax, but not paint), and the substrate may be almost any substrate capable of receiving and holding ink, including relatively rigid substrates such as plaster and wood. However, typically the substrate is a flexible substrate, such as paper (of all types, but preferably heavyweight matte paper) or canvas.

According to the method of this aspect of the invention, one or more of the colors that the printer is capable of printing that appear in a selected graphic/image or photograph are disabled, and the image or photograph is printed by the printer, under control of the computer, on the substrate without the disabled color or colors, That is, there is provided a method of producing a piece of artwork using a computer-controlled color printer capable of printing at least three colors, comprising: a) inputting or selecting a multicolor image (such as a digital photograph) so that it is provided in the computer; b) selectively disabling one or more of the colors, while not disabling all of the colors besides black, of the printer to insure little or none of the one or more disabled colors is printed with the printer; and c) with the printer, printing the non-disabled color or colors of the image onto a substrate. The art work so provided on the substrate has a unique quality that—depending upon the details of the image (e.g. photograph), the substrate, the color or colors disabled, and/or the color or colors that have been printed—may be variously described as pseudo-abstract, eerie, primitive, and/or ethereal. The art associated with such a work includes choosing the subject, selecting, taking, and/or creating a particular suitable photograph or graphic displaying the subject, and selecting which color or colors will be disabled, and printed.

According to another aspect of the invention, the work produced according the preceding paragraph may be further developed (that is acted upon) by adding paint to various portions of what has been printed on the substrate to achieve different effects and/or level of abstraction or clarity. For example, different colors than originally existed in the photograph or graphic may be substituted with paint or ink of different color, or existing colors may be modified or accentuated, and texture can be added to small parts, some, or substantially all of the printed work. Any standard or subsequently developed implements may be utilized to further develop the work including, but not limited to, brushes, rollers, palette knives, air brushes, pencils, pens, and/or crayons.

In the execution of the method of the invention, d) may practiced by applying texture to spaced portions of the substrate using a palette knife, eye-dropper, or the like; and the method may further comprise adding illustrated objects, foreign materials, or effects, to spaced portions of the substrate. In the method b) may be practiced to fully, or only partially, disable one or more colors. Dramatic effects are especially obtained by disabling black and near black.

Often, c) is practiced using a thermal ink-jet printer, although laser and other types of color printers may alternatively be used. For example, c) may be further practiced using an ink-jet printer having a black ink cartridge as well as at least one primary color ink cartridge, and b) practiced by removing an active black ink cartridge from the printer to thereby disable printing with black ink. Alternatively or additionally, b) may be using software in a computer controlling a printer.

In many situations, the multicolor image of a) is a digital photograph, and the digital photograph is taken by an artist and input into the computer by the artist, and a)-d) are practiced to produce a pseudo-abstract final art work. The method is also particularly suited for use in a curriculum to teach art to children.

The invention also piece of paper or canvas comprising a pseudo-abstract art work produced by practicing the method described above. Preferably the piece of paper is non-glossy paper, such as at least 30 pound matte paper.

The invention also relates to a color printer controllable by a computer and capable of printing at least three colors on a substrate; and mechanical devices interconnected to computer controls and/or software which act on the printer or computer controlling the printer to selectively and temporarily disable the printing of one or more colors with the printer. The printer may comprise a thermal ink-jet printer, and the mechanical devices and/or software may include software in the computer.

The invention also relates to a method of producing a work of art using a thermal ink-jet printer having an active black ink cartridge and at least one active primary color ink cartridge, and controlled by a computer, comprising: a) inputting or selecting a multicolor image so that it is provided in the computer; b) removing the active black ink cartridge from the printer, or controlling the printer with software, to disable from about 80-100% the capability of the printer to print black or near black while not significantly disturbing operation of the at least one active primary color cartridge; c) with the printer, printing a substantially accurate representation of the image, but without about 80-100% of the black or near black, onto a substrate of paper or canvas; and d) further acting upon the substrate from c) to add artistic elements to the substrate to produce a final artwork. For example, d) is practiced by adding acrylic paint to spaced portions of the substrate to provide colors and textures not present in the original image, and c) is practiced so that the substrate is at least thirty pound matte paper, and a) is practiced using a digital color photograph as the image.

It is the primary object of the present invention to provide for the production of an unusual and/or easy to produce art form in a simple and effective manner. This and other objects of the invention will become clear from an inspection of the detailed description of the invention, and from the appended claims.

BRIEF DESCRIPTION OF THE DRAWINGS

The file of this patent contains at least one drawing in color. Copies of this patent with color drawings will be provided by the Pant & Trademark Office upon request and payment of the necessary fee.

FIG. 3 is a partially perspective, partially schematic, view of a computer and printer utilized according to the present invention;

FIG. 4 is a detailed perspective view of part of the printer of FIG. 3 showing the ink cartridges (or pens) provided therein;

FIGS. 5A & 5B illustrate a high level flow diagram showing an exemplary software control for providing one alternative for the practice of a method according to the present invention;

FIG. 13 is a schematic showing an exemplary "Simple" main screen used to implement the flow sheet of FIGS. 10-12 on a computer;

FIG. 14 is a schematic view of an exemplary dialog box that appears when the "File" designation in FIG. 13 is right-clicked;

FIG. 16 is a schematic showing of an exemplary dialog box that appears when the color arrow of FIG. 15 is clicked on;

FIG. 17 is a showing like that of FIG. 13 for an exemplary "Advanced" main screen to implement the flow sheet of FIGS. 10-12 on a computer;

FIG. 18 is a detailed schematic showing of an exemplary screen when the "Add" option of FIG. 17 is selected;

DETAILED DESCRIPTION OF THE DRAWINGS

Figure 1:
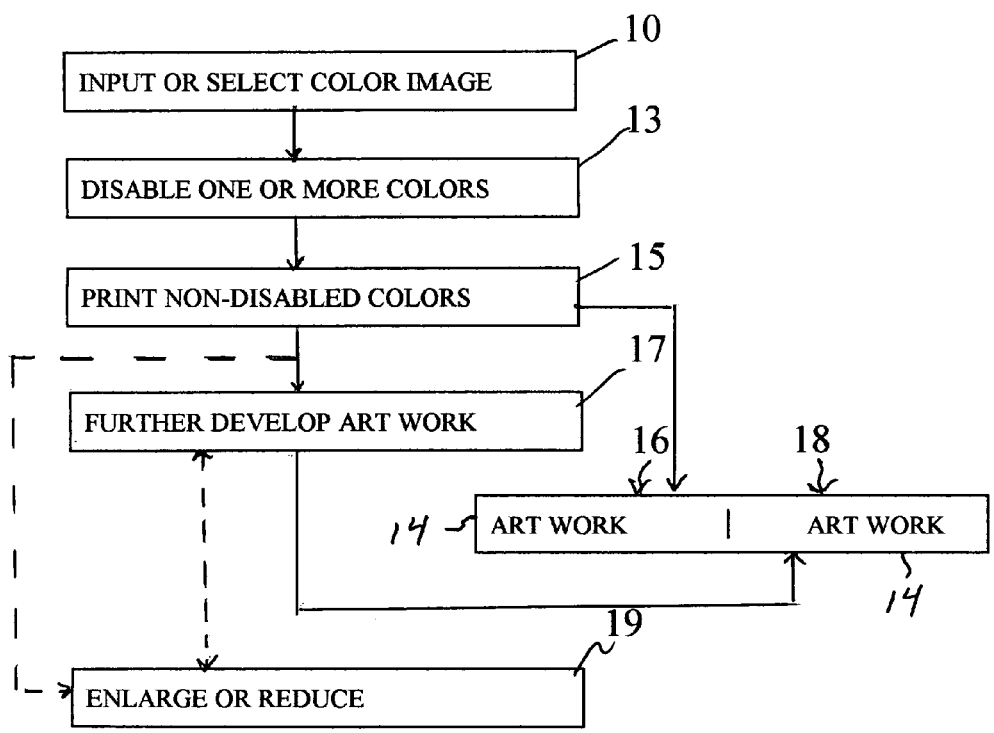
FIG. 1 is a box diagram illustrating the practice of an exemplary method according to the present invention.

The basic method steps according to various aspects of the present invention are diagrammatically illustrated in FIG. 1. As indicated by box 10, an image (graphic or photograph) 9 (see FIGS. 3 and 5A) is input into or selected by a computer 11 (e.g. a PC, and shown schematically in FIGS. 2, 3, and 5). The image 9 is multicolor, that is has two or more colors, and preferably has an almost infinite number of colors [e.g. there are 16.7 million possible combinations or colors for twenty-four bit RGB color images]. For example, the image 9 may be a digital color photograph taken by the artist that is input into the computer 11 by conventional techniques, or may be a color photograph or colored graphic from a website on the Internet (or local network) accessed by the computer 11 through a modem, cable connection, or the like, or already appearing as a document in digital form in the computer 11. Other images 9 can also be utilized, however.

The full color image 9 may be printed out by the color printer 12 (see FIGS. 2-4) to provide a reference document if desired. Then—as indicated by box 13 in FIG. 1—one or more colors of the printer are disabled so that they will not print onto a substrate, and then the non-disabled color or colors of the image 9 are printed onto a substrate 14, as indicated by box 15 in FIG. 1. The substrate 14 may comprise the final work of art (with or without the artist's name, a copyright notice, and/or title, typically added in pencil, but possibly added using software for that purpose in the computer 11), as illustrated schematically at 16 in FIG. 1, or further procedures may be employed.

The substrate 14 may be any substrate that is capable of receiving and retaining ink (this term including toner and wax) from the printer 12. Depending upon the type of printer 12 utilized, the substrate 14 may be a relatively rigid material, such as certain types of wood, plaster, clay, or metal, as long as relative movement between the printing elements of the printer 12 and the rigid substrate 14 is possible. More typically, however, the substrate 14 is paper or canvas, which can actually be fed through the printer 12. Types of paper that are suitable include, without limitation, twenty-four pound or greater bond wood paper, cotton, hemp or flax paper, mixtures of these (and other conventional) types of papers, matte finish photo paper (e.g. thirty-six pound available from Hewlett-Packard Co., hereafter "HP", or forty-four lb. available from Epson America, Inc.), glossy photo paper (e.g. 9 mil thick paper available from HP), fine art papers available from Legion Papers (e.g. at www.legionpaper.com), and watercolor paper (e.g. 140 pound if feedable through the printer 12), The type of substrate 14 used will depend upon the colors, the further processing steps (if any) desired, the type of printer 12 utilized, and other factors. For example typically glossy photo paper is not used if paint or other materials are to be applied to the substrate 14 after the image is printed thereon since the glossy nature of the paper would make such application difficult or impossible. For most purposes bond paper (24 pound or greater, of any conventional material), matte finish photo paper (e.g. at least about thirty lb.), and canvas are preferred for the substrate 14.

Where the artwork 16 is the final work of art, it may be framed and/or displayed, and may include the artist's name, a copyright notice, and/or a title, or other writing, as described above.

Desirably, the art work 16 is not the final art work produced, but rather further development of the art work is practiced, as illustrated by box 17 in FIG. 1, to produce the final art work 18. The further processing procedures that may be practiced as schematically illustrated by box 17 are as variable as art techniques themselves. For example, using a paint brush (e.g. a flat sable brush) one can apply conventional paint to the substrate 14 to replace the color(s) not printed, to change the color(s), to add color, to add illustrated objects, or to add effects (e.g. shadows, light, luminescence, stippling, etc.), etc. Texture can also be added, such as by applying paint or pliable wax (or other pliable material such as rubber cement, paraffin, etc.) with a palette knife (or eye-dropper or the like), and/or or by incorporating foreign materials (e.g. sand, glitter, plastic or metal flecks, glass beads, pieces of glass, pieces of string, charcoal, etc.) into paint or other applicable substance.

The type of paint utilized to make the artwork 18 will depend upon the substrate 14, the image printed, and other factors. For example watercolors or oil colors may be used where the substrate 14 is appropriate. However, for most paper substrates, acrylic paints are desired, whether applied by brush, roller, and/or palette knife. Instead of or in addition to paint, color, texture, writing, graphics, or the like may be applied to the substrate 14 using a pencil, pen, crayon, or any other suitable conventional, or to be developed, implement.

Further, prior to, or even after, the procedure in box 17, the artwork can be enlarged or reduced, as illustrated schematically at 19 in FIG. 1, Using any conventional technique or equipment.

Almost any type of color printer can be used as the printer 12 according to the invention, such as an old style Textronix printer which uses colored bars of wax (which are heated to liquefy) as the ink, modern and old style laser printers (such as the HP LaserJet series), or even—for some mass produced works of art—offset (four color) printers, etc. In the exemplary embodiment illustrated in FIGS. 2-4, however, a thermal inkjet printer is illustrated as the printer 12. For example an HP color DeskJet or PaintJet printer may be utilized. [The PaintJet printer is described in some detail in the HP Journal, Volume 39, No. 4, August 1988, incorporated by reference herein]. Specifically illustrated as the printer 12 in FIGS. 3 and 4 is a modified version of an HP DeskJet 870Cxi printer.

Figure 2:
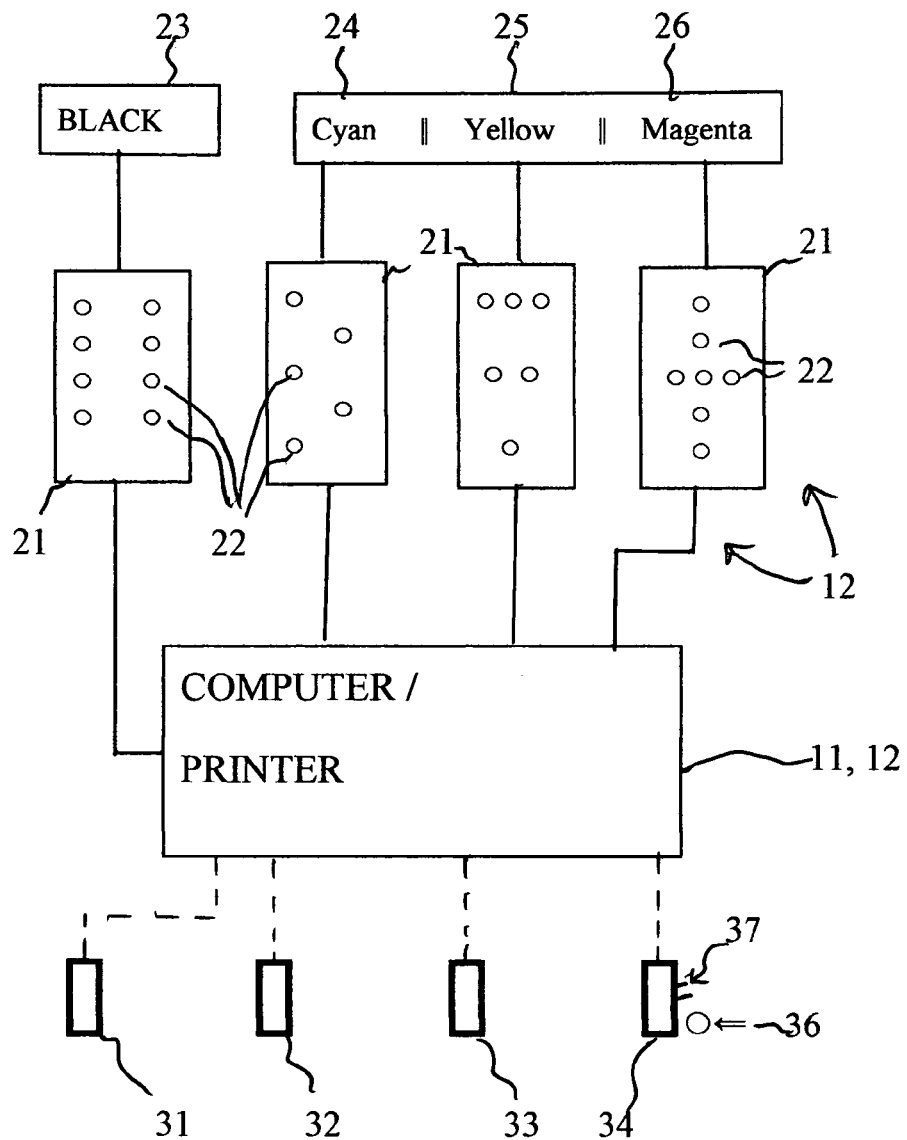
FIG. 2 is a schematic diagram illustrating computer control of ink jet nozzles of a color inkjet printer pursuant to the present invention.

As schematically illustrated in FIG. 2, the printer 12 includes a plurality of orifice plates 21 each having a plurality of nozzles 22 that may be in any desired configuration, only some of the almost infinite variety of nozzle patterns schematically illustrated in FIG. 2. Typically, each nozzle 22 has a thin-film resistor (not shown) associated therewith for heating ink from a reservoir when enabled, and then allowing the ink to be applied to the substrate 14. Each orifice plate 21, and the nozzles 22 associated therewith, may be associated with a different reservoir, each reservoir containing a different color ink. For example the left-most orifice plate 21 in FIG. 2 is operatively connected to a black ink reservoir 23, with subsequent orifice plates 21 operatively connected to cyan or blue 24, yellow 25, and magenta or red 26, ink reservoirs, respectively. In a conventional HP DeskJet 870Cxi, for example, the reservoirs 24-26 and associated orifice plates 21 may be mounted in a common cartridge 28 (see FIGS. 3 and 4, also called a "pen"), such as an HP51641A cartridge, while the black ink reservoir 23 and associated orifice plate 21 may be provided in a separate cartridge 29 (see FIGS. 3 and 4), such as an HP51645A cartridge. Alternatively, as in some PaintJet printers, or Canon printers, the cyan/blue, yellow, and magenta/red reservoirs may be mounted in different cartridges. It is noted, however, that any color inks may be utilized, and typically any number of reservoirs of different colors may be provided (e.g. more than or less than four, as shown in FIG. 2).

In substantially the simplest form of the invention, for example, for the printer 12 of FIGS. 3 & 4 the active black ink cartridge 29 is simply removed from the printer 12, and if necessary for printer operation a dummy or empty cartridge is substituted therefor. In a more sophisticated and variable form of the invention, the printer 12 is provided with a plurality of buttons 31-34 (seen most clearly in FIGS. 2 and 4) for selectively disabling the nozzles 22 of the orifice plates 21. The position of the buttons 31-34 may be sensed by any suitable conventional means, such as photoelectric cells, piezoelectric devices, etc., for changing the physical positions of the buttons 31-34 into electrical/digital signals. The buttons 31-34 thus ultimately may actuate any suitable device for precluding full operation of the nozzles 22 associated with any one or more of the reservoirs 23-26. Exemplary, non-limiting, mechanisms that allow selective disabling of nozzles for an inkjet printer are shown in U.S. Pat. Nos. 6,145,980, 6,099,101, 6,238,112, and 6,056,386 (the disclosures of which are hereby incorporated by reference herein). [Also see U.S. Pat. No. 6,045,955, incorporated by reference herein, which teaches disabling certain printing components of a laser printer, and which may be utilized in a laser printer embodiment of the invention].

For example, if the button 31 is actuated, at least the vast majority of the nozzles 22 associated with the black ink reservoir 23 are disabled, and similarly for the reservoirs 24-26 upon activation of the buttons 32-34. A conventional interlock (not shown) may be provided for the buttons 31-34 to insure that not all are actuated at once, and to insure that not all of 32-34 are activated at once whether or not button 31 is activated. A reset button 35 may be provided to manually reset the printer 12 to full color mode after one image 9 is printed, and/or a conventional automatic reset feature (not shown) may be provided.

Also, detents can be provided for the buttons 32-34, one such detent being shown by spring-pressed ball 36 and ball-receiving depressions 37 for the button 34 in FIG. 2. For example, if button 34 is pressed down so that the first depression 37 receives the ball 36, then all of the nozzles 22 associated with reservoir 26 will be disabled, so that no magenta/red color will be printed at all. If, however, the button 34 is pressed down so that the second depression 37 receives the ball 36, then only pure red or magenta color will not be printed out in the work 16, but where secondary colors are to be produced (such as a purple or violet when magenta and cyan are both printed in the same area) using magenta, then those secondary colors will still be printed in the work 16. An almost infinite variety of other options are also available.

Note that the activation of the buttons 31-34 need not completely disable all printing with a particular color, just very greatly reduce it so that little (e.g. no more than about 25%, preferably no more than about 10%) of that color, compared to what would normally be printed, is printed.

Other components of the printer 12 (including the paper/substrate feed, platen, carriage for the cartridges 28, 29, locking mechanism for the cartridges 28, 29, etc.) are substantially conventional, and need not be described.

Of presently investigated commercial printers, the HP DeskJet 870Cxi printer is fairly unique in that the black ink from the black ink cartridge is mixed with other inks from the color cartridge to make up a number of dark and near-black colors. There are many colors in a conventional photograph that appear to be black that aren't really black, but only "near black". "Near black" is a color that to the average, unaided, human eye appears to be black, but is not pure black and cannot be disabled by—for example—disabling a black ink cartridge alone.

With most printers, such as the HP DeskJet 970Cse and HP OfficeJet v40xi, removing the black ink cartridge does not preclude printing what is perceived to be black, since near black is indistinguishable by the human eye from actual black. A typical photograph having significant areas that are perceived to be black may actually have only about 5% pure black, and about 95% near black, so that when the pure black is removed there is little discernable difference. Therefore, in most cases when controlling a printer 12 aside form an HP DeskJet 870Cxi printer (or printers with like color generating procedures), there must be some procedure and mechanism which precludes printing of all or most near black, as well as pure black.

An on-board computer, or the PC 11, may be controlled to achieve the result set forth above, that is disabling all or most of the near black as well as the pure black, in order to get the desired effect. One such system is illustrated in FIGS. 5A & 5B, while another is illustrated in FIGS. 10-19.

Figure 5B:
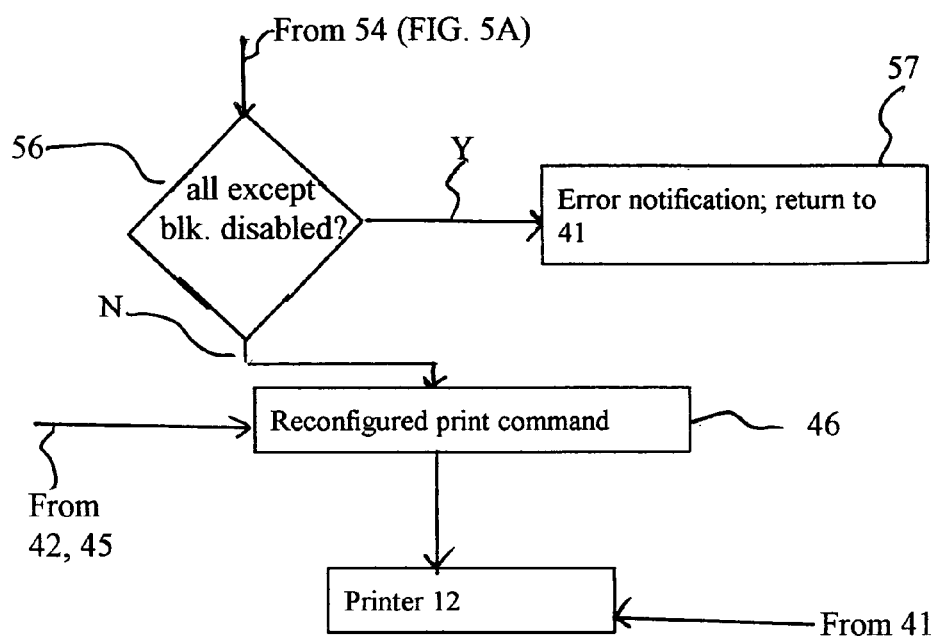

FIGS. 5A & 5B illustrate a high level flow sheet showing one exemplary form of a control system according to the present invention in which by manipulating an input device (e.g. keyboard and/or mouse) associated with the computer 11 printing of various colors may be disabled. This is also one of many alternatives to using the buttons 31-34 on the printer 12 to selectively disable colors. Depending upon the particular system used, and at what level the colors are evaluated, the primary colors may be cyan, yellow, magenta and black (CYMK), or red, green, and blue (RGB), or other combinations such as HSB and LAB. However, CYMK and RGB are by far the most common. FIGS. 5A & B are described with respect to CYMK.

As seen in FIG. 5A, computer software 40 associated with the computer 11 follows the procedures illustrated further in FIGS. 5A & 5B, displaying various options on the monitor of the computer 11. Decision box 41 asks if any colors are to be disabled in the printing of the image (e.g. photograph) 9. If "No" (N), then the printer 12 is controlled as normal. If "Yes" (Y), then further decisions need be made. For example, decision box 42 requires a determination as to whether black and near black will be disabled, whereas box 43 requires a decision regarding the three primary colors that normally will be provided for the printer 12 (i.e. cyan or blue, yellow or green, and magenta or red). Decision box 44 inquires regarding secondary colors, including (without limitation) orange, purple, violet, brown, etc. If a secondary color is to be disabled, the nozzles 22 of an ink-jet printer (as the printer 12) would, for example, be controlled so that the mixture of primary colors to make the secondary color would never print in the same area (that is if there were to be no orange, the nozzles 22 would be controlled to prevent printing magenta and yellow in the same area on the artwork 16).

If desired, if Y is selected for the decision box 42, then—as indicated at 45 in FIG. 5A—the user could be asked a level of disablement, e.g. complete disablement of black and near black (100%), or only a small percentage of the black nozzles 22 that would normally print would print (e.g. at least about 80% would be disabled, preferably at least about 90%), and any other cartridge nozzles that print near black would be disabled or controlled to preclude or minimize the printing of near black. Ultimately, a control signal would be generated after 42, 45, and the reconfigured print command (indicated by box 46 in FIG. 5B) would be provided.

Associated with the decision box 43, if Y is selected, would be the decision blocks 48-50 for the three primary colors, respectively, and similarly a decision block 51, 52, etc. is provided for each of the secondary colors. Associated with each of the decision blocks 48-52 may be a block 54 (only one of which is shown in FIG. 4 for clarity of illustration) which asks the operator to select the level of disablement (e.g. completely (100% disabled) or almost completely disabled (e.g. from 80-95% disabled).

Since the invention does not have applicability when one desires simply to print out black, preferably there is a decision block 56, which determines whether all colors except for black have been disabled. If the answer is N, then control proceeds to box 46, so that printing of the artwork 16 takes place. If the answer is Y, then—as indicated by 57 in FIG. 5B—an error notification is provided to the operator (typically on the monitor of the computer 11) indicating what the error is. The operator must then correct the error, or there is automatic return to block 41.

Two actual examples according to the invention will now be described. The first example is illustrated in FIG. 7, and the second in FIG. 9. Note that in the following discussions FIGS. 6-9 are described as originals, but in the actual patent document submitted are in fact digital color copy renditions of originals, on 24-pound+ wood bond paper.

Figure 6:
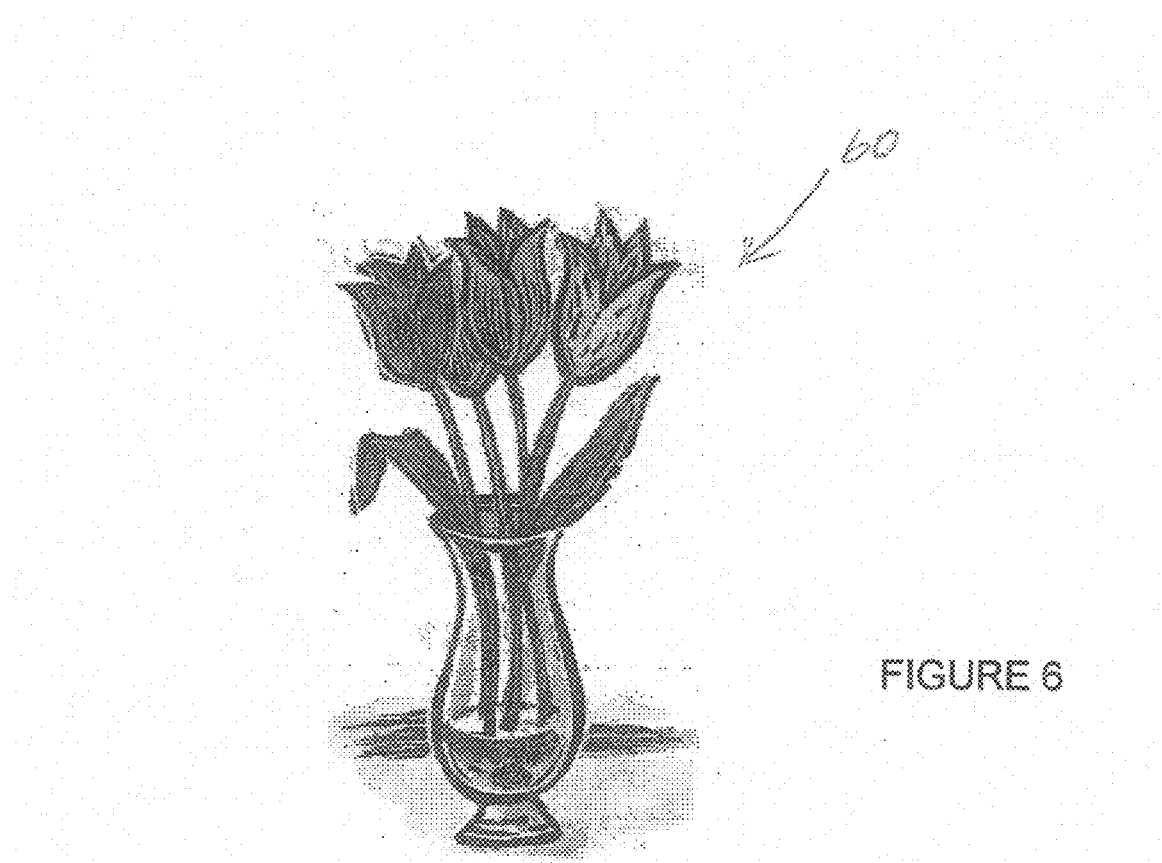
FIG. 6 is a printout of a multicolor graphic printed using a fully enabled inkjet printer.
Figure 7:
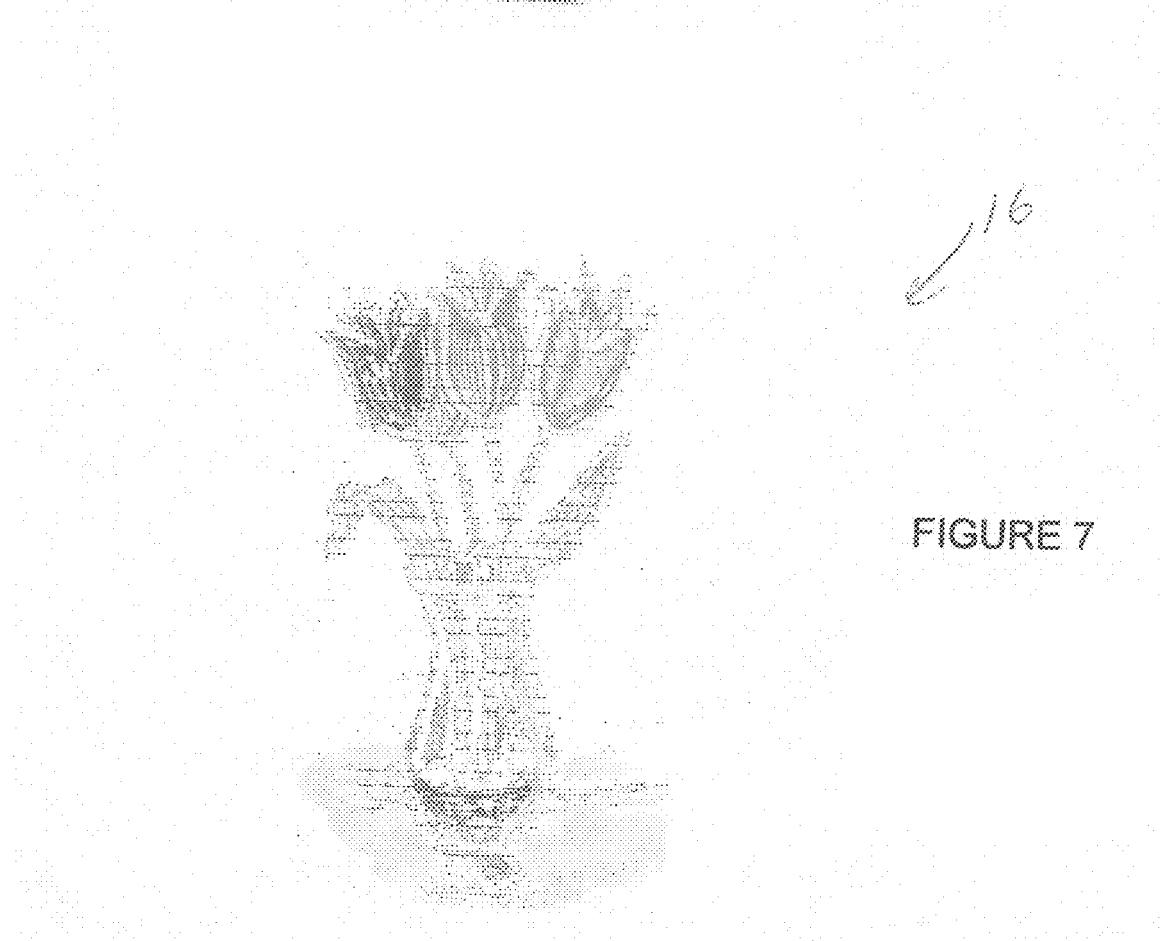
FIG. 7 is a printout of the same graphic as in FIG. 6 produced according to the invention by disabling the black ink cartridge of the same printer.

FIG. 6 is a printout 60 of a clip-art graphic (image 9) obtained from a clip-art website over the Internet, and printed out on a fully enabled HP DeskJet 870Cxi printer in full color on a piece of 24 pound paper (25% hemp, 25% cotton, 50% mixed post consumer waste) as the substrate 14, to illustrate what the graphic looks like in full color, The artwork 16 of FIG. 7 is obtained by using the same image 9, printer 12, and substrate 14 as in FIG. 6, only by manually removing the active black ink cartridge 29 from the 870Cxi printer and replacing it with an empty cartridge. Note that the artwork 16 of FIG. 7—compared to the printout 60 of the same graphic in FIG. 6—can be considered pseudo-abstract, having less rigid definitions of the components, muted colors, and in this case almost a colored pencil effect compared to the rich ink color of the printout 60.

Figure 8:
FIG. 8 is a printout of a color photograph printed using a fully enabled inkjet printer.
Figure 9:
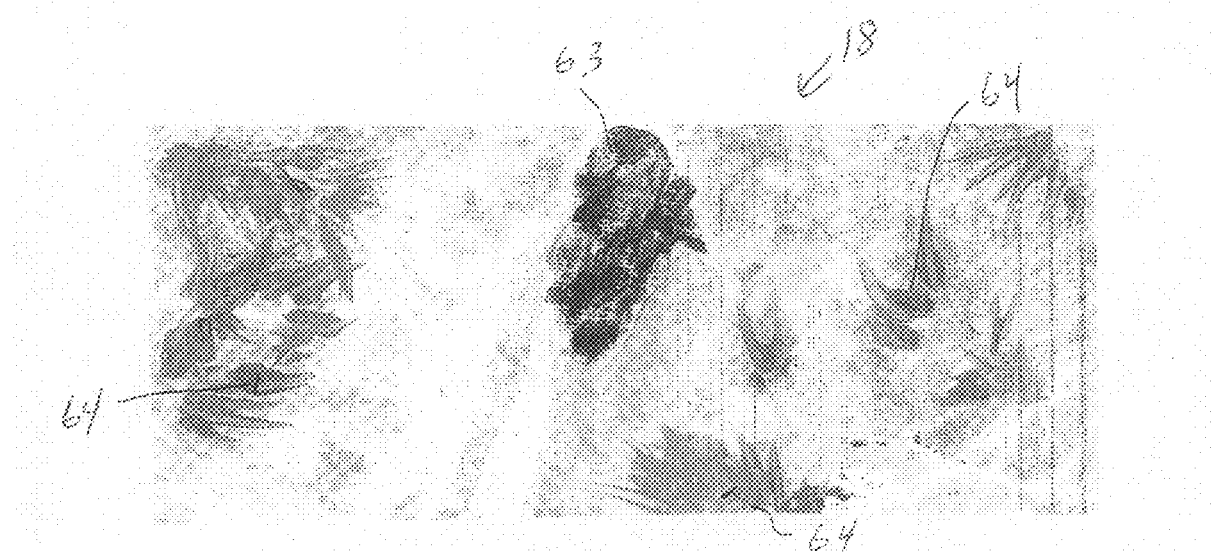
FIG. 9 is a printout of the same photograph as in FIG. 8 with the black ink cartridge of the same printer disabled and after paint has been added to the photograph.

FIG. 8 is a printout 61 of a color digital photograph that was input into the computer 11 and printed out by the fully enabled HP 970Cse printer (a fully enabled HP 870Cxi printer would print almost as well) onto a substrate 14 of the same hemp, cotton, and recycled fiber paper as for FIGS. 6 and 7. FIG. 9 is a work of art 18 produced by printing out the same photograph as in FIG. 8 on a substrate of thirty six pound matte finish HP photo paper after the active black cartridge 29 of an HP 870Cxi printer 12 was replaced by an empty one, and then applying acrylic paint to various portions of the substrate 14. For example, the brown of the hair 63 is acrylic paint (in the output from the black-disabled printer 12 there was a blank space where the hair was) applied by a flat sable brush. Also, the textured and brightly green and blue-green colored leaves or needles 64 of some of the tree branches are acrylic paint applied with a palette knife. The final artwork 18 produced has an eerie quality compared to the printout 61, is pseudo-abstract, and has a type of depth and warmth not found in the printout 61.

Figure 19:
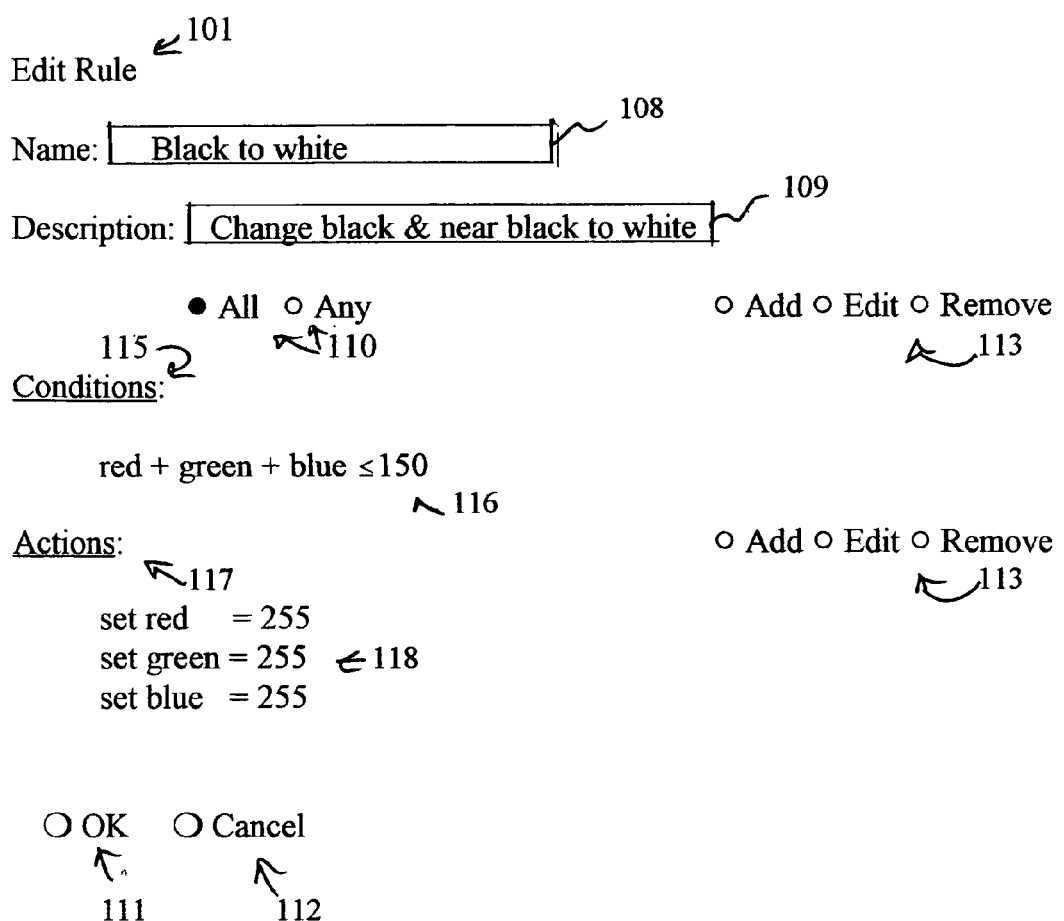
FIG. 19 is a detailed schematic showing of an exemplary screen when the "Edit" option of FIG. 17 is selected.
Figure 20:
FIG. 20 is an exemplary digital photograph printed by a color printer.
Figure 21:
FIG. 21 is the same photograph as in FIG. 20 printed after it is modified to change black and near black to white, and to sharpen green, using the system and procedure of FIGS. 10-19.

FIGS. 10-19 schematically illustrated a more complex computer system (including software) and procedure for controlling virtually any color printer 12, such as for an HP DeskJet 970Cse or HP OfficeJet v40xi, to achieve results like those in FIGS. 7 and 9, such as illustrated by comparing FIGS. 20 and 21.

Figure 10:
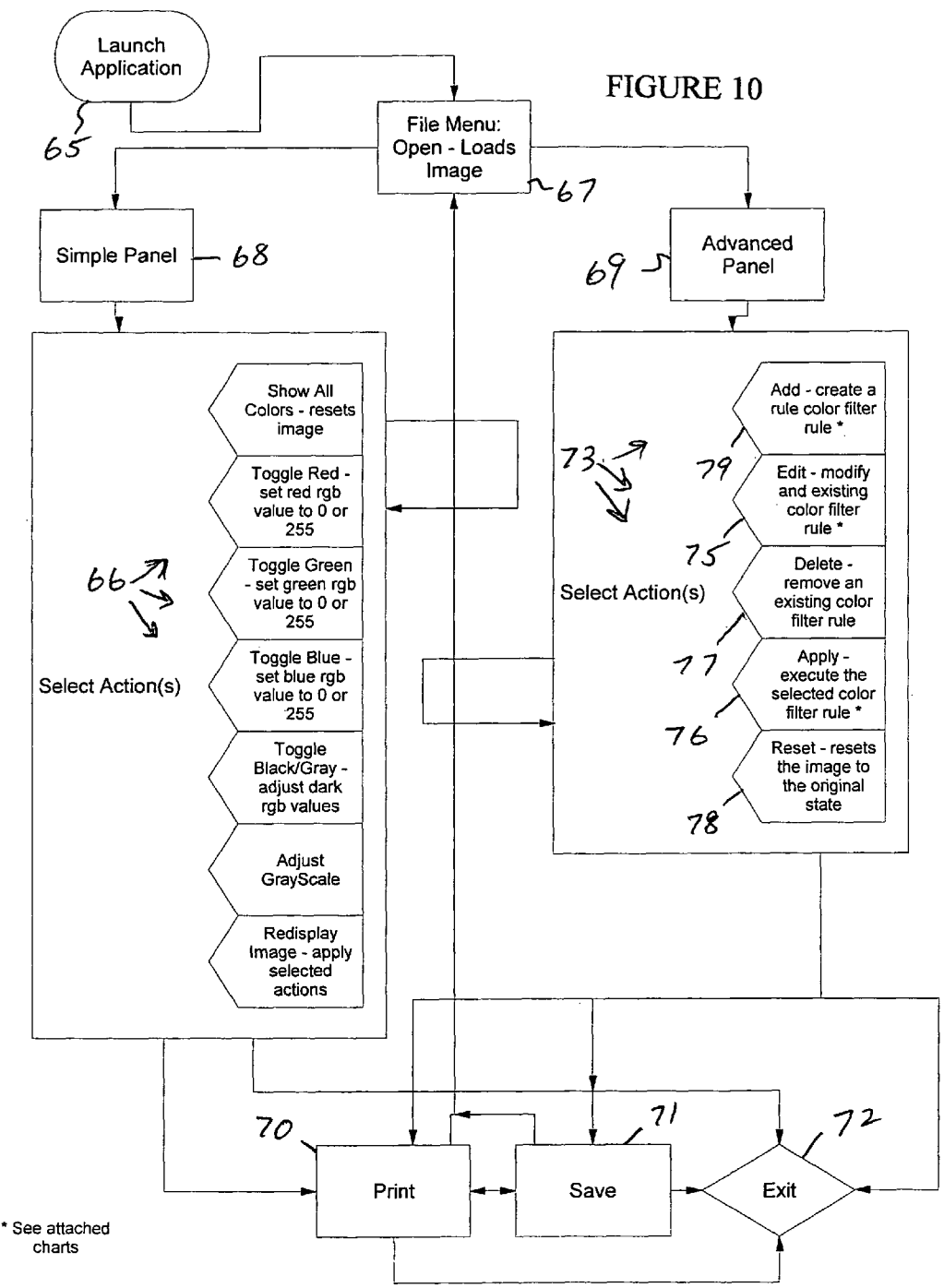
FIG. 10 is a high level flow chart showing an alternative form of computer software that may be utilized in the practice of the present invention.

In the high level flow sheet of FIG. 10, the software is launched on a computer 11 as is conventional as schematically illustrated at 65, which displays a screen on a monitor, loading the associated images, as the "File" icon illustrated at 67. While a single panel may be provided, in the FIGS. 10-19 embodiment two separate panels are provided, a simple panel 68, an exemplary main screen of which is shown in FIG. 13, and an advanced panel 69, an exemplary main screen of which is shown in FIG. 17.

For the simple panel 68, various straightforward and self-explanatory options (actions) are available for selection (one or more may be selected), such as illustrated schematically at 66 in FIG. 10. Options for printing an original or massaged photograph or graphic, saving it, or exiting, are illustrated at 70, 71 and 72, respectively. When 70 or 71 are selected, conventional screens come up asking for further input.

For the advanced panel 69, options/actions 73 may include an "add" option 74 which allows one to create a color filter "rule" (see FIG. 11), an "edit" option 75 which allows one to modify an existing color filter rule (again see FIG. 11), an "apply" option 76 which allows one to execute one or more selected color filter rules (see FIG. 12), a "delete" option 77 which allows one to remove an existing color filter rule, and a "reset" option 78 which allows one to reset the image displayed on the screen to its original condition.

Before describing the details of FIGS. 11-19, it should be noted that the system of FIGS. 10-19 preferably operates using pixels with RGB values. This is exemplary, only, however, and other systems can be used (e.g. if twenty-four bit color isn't used).

A digital color image 9 is made up of individual pixels. Each pixel is just an RGB data value (Red, Green, Blue). Each pixel's color sample has three numerical RGB components (Red, Green, Blue) to represent the color. These three RGB components are three 8-bit numbers for each pixel. Three 8-bit bytes (one byte for each of RGB) is called 24 bit color. Each 8 bit RGB component can have 256 possible values, ranging from 0 to 255. For example, three values like (250, 165, 0), meaning (Red=250, Green=165, Blue=0) to denote one orange pixel.

That is 255 is the maximum possible number that can be stored in an 8 bit byte. Larger numbers require multiple bytes, for example two bytes (16 bits) can hold up to 256×256=65536 unique values. Twenty four bit RGB color images use 3 bytes, and can have 256 shades of red, and 256 shades of green, and 256 shades of blue. This is 256×256×256=16.7 million possible combinations or colors for 24 bit RGB color images. The pixel's RGB data value shows "how much" Red, and Green, and Blue, at a pixel location. The three colors and intensity levels will be combined at that image pixel, at that pixel location.

The composite of the three RGB values creates the final color for that one pixel area. In the RGB system, Red and Green make yellow, so (255, 255, 0) means Red and Green are each fully saturated (255 is as bright as 8 bits can be), with no Blue (zero), with the resulting color being yellow. Pure black has an RGB value of (0, 0, 0) and white is (255, 255, 255). Gray has the property of having equal RGB values. So (220, 220, 220) is a light gray (near white), and (50,50,50) is a dark gray (near black). Gray has no unbalanced color cast. What is "near black" may vary depending upon particular images, and systems, but typically if the total RGB (R+G+B) value is less than or equal to about 160, that is near black.

Figure 11:
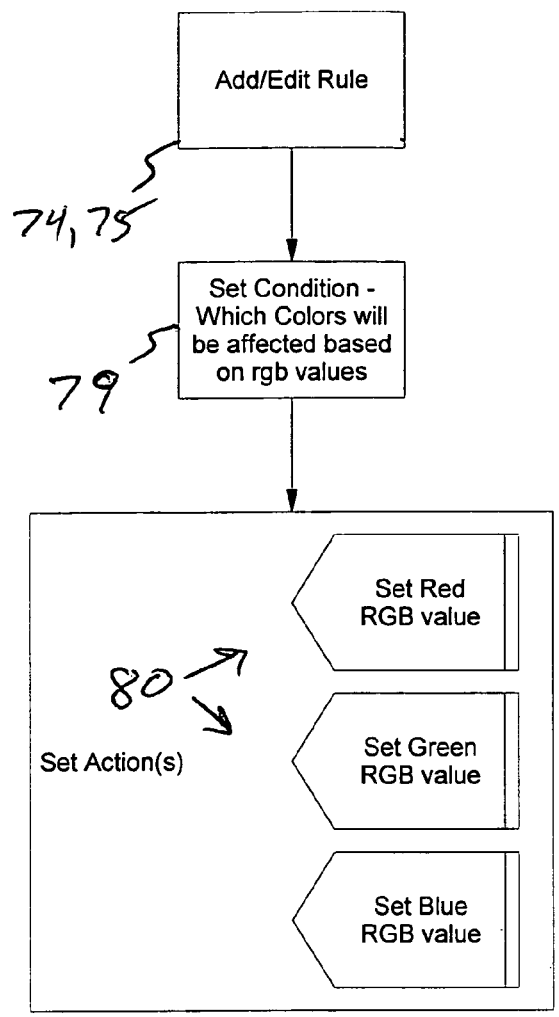
FIG. 11 is a flow sheet further developing the Add/Edit Rule of FIG. 10.

FIG. 11 provides a high level flow sheet for the options 74, 75. As indicated at 79, a set of conditions—which colors will be affected based upon RGB (red, green, blue) values—is input, using a keyboard, mouse, and/or other inputting device. Then, as indicated at 80, the red, green, and blue values are set, between 0 and 255, to achieve the condition in 79.

Figure 12:
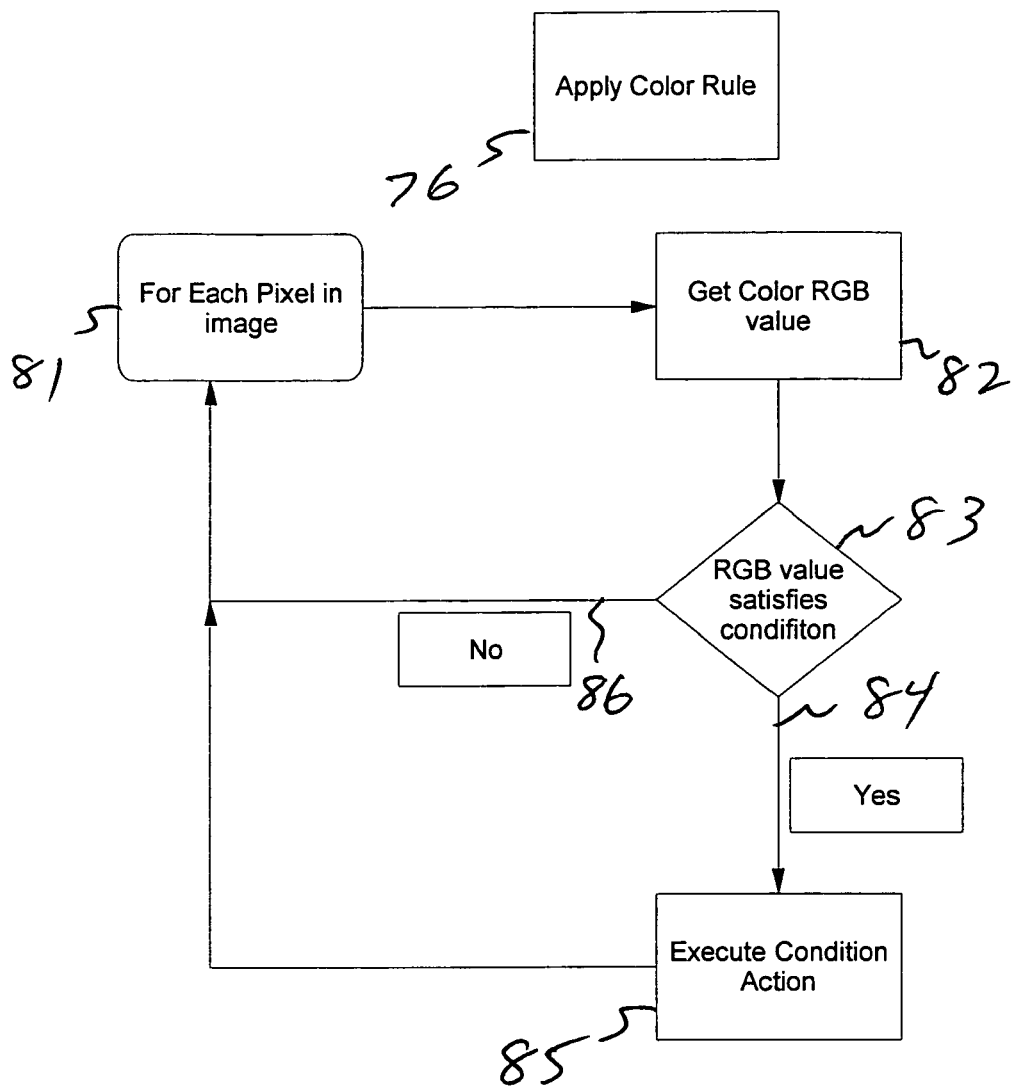
FIG. 12 is a flow sheet further developing the Apply Color Rule of FIG. 10.

FIG. 12 is a high level flow sheet for the option 76. For each pixel in the image, as indicated at 81, the RGB value is obtained, as indicated at 82. The obtained value from 82 is then evaluated in decision block 83 to determine if it meets the set condition(s) of 79 (FIG. 11). If "yes" (84), then the condition is executed as indicated at 85, changing the image (e.g. digital photograph) displayed on the screen to accommodate the condition(s) 79. If "no" (86), then the pixels are further evaluated at 81.

FIG. 13 schematically illustrates an exemplary "simple" panel 68 as displayed on a screen. Any one or more of the options 66 may be launched simply by "clicking" on them, or actuating them in any other conventional way. One may also click on the arrow 87, and move side-to-side to adjust the gray scale. One of the boxes 88 is also "clicked on" to fit a photograph—or other image to be displayed and worked on—in the photo area 89.

Figure 15:
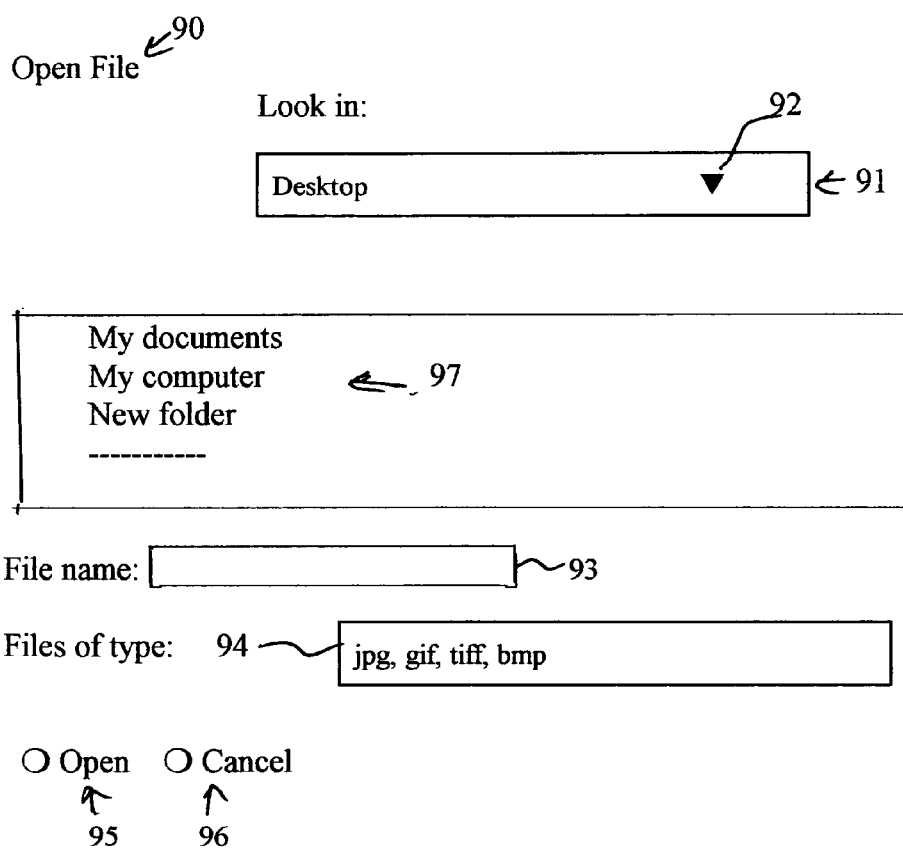
FIG. 15 is a schematic showing an exemplary screen when the "open" option of FIG. 14 is selected.

An image is drawn into the area 89 by first clicking on the "File" icon 67, which then displays a box such as illustrated in FIG. 14, and then the "Open" option 90 is selected. An exemplary screen that may be displayed when the Open option 90 is selected is illustrated in FIG. 15. The box 91 includes an arrow 92, which when clicked on displays a box such as in FIG. 16. The options in FIG. 16 are only exemplary, and other or additional locations for images to be selected may readily be provided. Also, options may be provided in box 97, as also indicated in FIG. 15. By selecting the desired option 92 or 97 in FIG. 16, the desired image to be worked on may be located and selected, and brought to the photo area 89 of FIG. 13 (or FIG. 17) in a conventional manner.

Alternatively, the image to be brought to area 89 in FIG. 13 (or FIG. 17) may be located by inserting the correct file name in box 93, and selecting the correct file type in box 94. Once the name and/or location of the proper image is located (using the options 92, 97 in FIG. 15 or the boxes 93, 94), the image is opened by clicking on option 95, which brings the image to the area 89 in FIG. 13 (or in FIG. 17). Alternatively, the screen of FIG. 15 may be exited by clicking on option 96.

Once the image is in the area 89 of FIG. 13, it may be acted upon by selecting one or more of the options 66. The final image may be further acted upon by clicking on File 67 again, and then selecting option 70 or 71 form FIG. 14. Once the image is printed out, it may be painted or otherwise acted upon, as described above with respect to FIG. 9.

FIG. 17 illustrates an exemplary screen when the "advanced" panel 69 is activated. The panel 69 includes a "Rules" column 98 and a "Description" column 99. The rules 98 are color filter rules which adjust the RGB values of the pixels on an image in area 89 in predetermined manners. The descriptions 99 tell the user more detail about what the rules with which they are associated will do. Rules 98 may be created (clicking on option 100), edited (clicking on 101), or deleted (clicking on 102). Rules 98 may be applied by clicking on option 103. Clicking on option 104 undo's any previous action, while clicking on option 105 resets the image in area 89 to its original condition.

The display 106 is a conventional "EyeDropper" tool to show the three RGB color components for any image pixel that the cursor is on when the image is in the area 89. For the example in FIG. 17, the pixel of the image in area 89 that the cursor is on has a red value of 14, green of 170, and blue of 28.

FIG. 18 shows an exemplary screen if the option 100 is selected, that allows one to create a rule. The name the user wants to give the rule is inserted in box 108, the desired description in box 109, whether any or all of the conditions to be added are to be used is selected at 110, and the options 113 allow any text in the boxes 108, 109 to be acted upon further. Once the rule name and description have been properly input, the rule can be accepted by clicking on 111, or the entry can be canceled by clicking on 112.

Once the option 111 is accepted a screen comes up like that in FIG. 19, only without the data already input, and the desired conditions and actions are input.

The actual screen of FIG. 19 is exemplary of when the edit option 101 of FIG. 17 is selected. The rule that is displayed when the option 101 is selected is whichever rule 98 in FIG. 19 is highlighted when the option 101 is selected. The actual rule illustrated in box 108 of FIG. 19 is the "Black to white" rule, further described in box 109. The conditions that the rule evaluates are listed in area 115. In the example actually shown, the red, green and blue values of each pixel are added together to see if they are greater than or equal to 150. All black and near black colors are likely to meet this condition.

The actions that occur if the condition(s) 116 is/are met are seen in area 117 in FIG. 19. In the example indicated, the action 118 is to set each of red, green, and blue to 255. When the value of a pixel is 255, 255, 255, it is pure white. The options 110-113 in FIG. 19 are the same as in FIG. 18.

The system, software, and procedure of FIGS. 10-19 may have other or additional standard options, actions, and procedures. For example, as seen in FIGS. 13 and 17, conventional options 119 may be provided for minimizing or enlarging the screen, or exiting the screen.

FIGS. 20 and 21 provide an illustration of what can be done using the system and procedure of FIGS. 10-19. FIG. 20 illustrates a digital photograph printed out on forty-six pound matte paper using an HP v40xi printer 12. FIG. 21 illustrates the same photograph printed out on the same type of paper using the same printer 12 after the rules "Sharpen green" and "Black to white" of FIG. 17 are selected. The revised photograph of FIG. 21 is first displayed on the screen in the area 89, and then printed by clicking on 67, then 70.

The artwork in FIG. 21 may be a final piece of art, or it may be acted upon further, adding further artistic elements, such as by applying acrylic paint with a paintbrush or palette knife, to add or subtract objects, to change or add colors, or the like, as more fully described above.

The above methods may be used by average unartistic individuals, or professional artists, and may be especially suited for teaching art to children. By having children practice all of the procedures according to the method in an art curriculum, they learn color, texture, and computer skills, while being able to produce a work of art they can be proud of even if they have only rudimentary drawing skills.

In the above description, all numerical or highly descriptive levels are considered approximate or "substantially" that level. Further, all ranges include all narrower ranges within the broad range; for example 80-100% disabled means 90-94% disabled, 81-88% disabled, 94-88% disabled, and all other narrower ranges within the broad range.

While the invention has been shown and described in what is presently perceived to be the most practical embodiment thereof, it will be understood that the modifications thereof are virtually infinite—as diverse as art itself—and therefore the claims are to be given the broadest interpretation possible consistent with the prior art.

What is claimed is:

1. A method of producing a piece of artwork using a computer-controlled color printer capable of printing at least three colors, comprising:
    a) inputting or selecting a multicolor image so that it is provided in the computer;
    b) selectively disabling one or more of the colors, while not disabling all of the colors besides black, of the printer to insure little or none of the one or more disabled colors is printed by the printer;
    c) with the printer, printing the non-disabled color or colors of the image onto a substrate; and then
    d) acting upon the substrate from c) to add artistic elements to the substrate to produce artwork.

2. A method as recited in claim 1 wherein c) is practiced by printing onto a substrate of paper or canvas.

3. A method as recited in claim 1 wherein d) is practiced by manually applying colored paints to spaced portions of the substrate from c).

4. A method as recited in claim 3 wherein d) is practiced by manually applying texture to spaced portions of the substrate using a palette knife, eye-dropper, or the like.

5. A method as recited in 1 wherein b) is practiced to fully disable one or more colors.

6. A method as recited in 1 wherein b) is practiced to only partially disable one or more colors.

7. A method as recited in 1 wherein b) is practiced to disable black and near black.

8. A method as recited in 1 wherein c) is practiced using a thermal ink-jet printer.

9. A method as recited in claim 8 wherein c) is further practiced using an ink jet printer having a black ink cartridge as well as at least one primary color ink cartridge; and wherein b) is practiced by removing the active black ink cartridge from the printer to thereby disable printing with black ink.

10. A method as recited in 1 wherein the multicolor image of a) is a digital photograph, and d) is practiced to manually act on the substrate.

11. A method as recited in claim 10 wherein the digital photograph is taken by an artist and input into the computer by the artist; and wherein a)-d) are practiced to produce a pseudo-abstract final art work.

12. A method as recited in claim 11 wherein b) is practiced to disable black and near black.

13. A piece of paper or canvas comprising a pseudo-abstract art work produced by practicing the method of claim 12.

14. A method as recited in claim 1 used in a curriculum to teach art to children.

15. A method as recited in claim 1 wherein b) is practiced using software in a computer controlling a printer.

16. A method as recited in claim 3 wherein d) is further practiced by adding illustrated objects, foreign materials, or effects, to spaced portions of the substrate.

17. A method of teaching art to children using a computer-controlled printer capable of printing at least three colors, comprising:
    a) inputting or selecting a multicolor image so that it is provided in the computer;
    b) selectively disabling one or more of the colors, while not disabling all of the colors besides black, of the printer to insure little or none of the one or more disabled colors is printed by the printer;

c) with the printer, printing the non-disabled color or colors of the image onto a substrate; and d) instructing the children to manually act upon the substrate from c) to manually add artistic elements to the substrate to produce artwork.

18. A method as recited in claim 17 wherein b) is practiced to disable from about 80-100% the capability of the printer to print black and near black.

* * * * *